United States Patent Office 2,894,003
Patented July 7, 1959

2,894,003

BENZONAPHTHOFURANOLS

Robert S. Long and Bennett G. Buell, Bound Brook, N.J., assignors to American Cyanamid Company, New York, N.Y., a corporation of Maine No Drawing. Application March 8, 1954
Serial No. 414,866

9 Claims. (Cl. 260—346.2)

This invention relates to substituted benzo(b)naphtho (2,1-d)-furans having the following formula

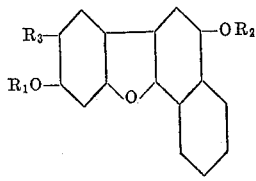

in which $R_1$ is selected from the group consisting of hydrogen and acetyl, $R_2$ is selected from the group consisting of R' and lower alkyl, $R_3$ being hydrogen when $R_1$ and $R_2$ are identical and when $R_2$ is lower alkyl, $R_3$ being selected from the group consisting of COOH and RNHCO— wherein R is selected from the group consisting of mononuclear aryl and chlorine-substituted mononuclear aryl radicals, $R_3$ being hydrogen only when $R_1$ and $R_2$ are identical. The benzo(b)naphtho(2,1-d) furan ring which is sometimes known as alpha-brazan is normally numbered as follows:

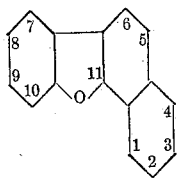

This numbering and nomenclature will be used throughout the specification and claims. It will be seen that the compounds of the present invention are 5,9-dihydroxy benzo(b)naphtho(2,1-d)furan or derivatives thereof. While the compounds of the present invention are not limited to any process of making them, it is an advantage that the compounds can be produced by reaction of naphthoquinone with resorcinol or its monoethers followed by cyclization with an acid catalyst such as sulfuric acid or acetic acid at very moderate temperatures ranging from about 80° C. up to somewhat above the boiling point of water, which temperatures are obtainable by operating under reflux.

This cyclization at such a low temperature is quite unusual as similar compounds such as 3,3'-dihydroxy 2,2'-binaphthyl require long heating at temperatures up to 270° C. It is not known why the formation of the furan ring in the compounds of the present invention is possible at such low temperatures and no explanation of this surprising property is advanced, the invention not being limited to any theory of reaction mechanism.

Some of the compounds described above are very valuable coupling components for azo dyes, the coupling proceeding readily without any attack on the diazonium salt.

The azo dyes have the following formula

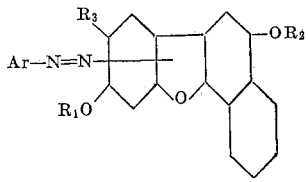

in which $R_1$, $R_2$ and $R_3$ are as defined above and Ar is a residue of a diazotized aromatic carbocyclic primary amine having not more than two benzene rings. In the case of most of the compounds the coupling takes place at the 10 carbon atom although where $R_3$ is hydrogen coupling at the 8 carbon atom may also be obtained.

A convenient starting point for coupling components of the present invention is 5,9-dihydroxy-benzo(b)naphtho-(2,1-d)furan which has the following formula

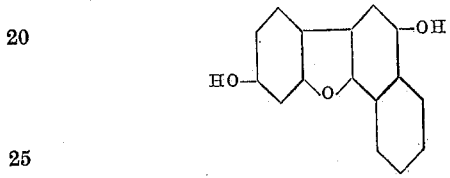

Although this compound is itself a coupling component and azo dyes may be prepared from it, still more important shades may be obtained, first by alkylation under conditions which normally alkylate alphahydroxynaphthalenes to produce 5-alkoxy-9-hydroxy-benzo(b)naphtho(2,1-d)-furans which also are good coupling components and can be used as such or can be further carbonated by the Kolbe reaction to produce 5-alkoxy-9-hydroxy-8-carboxy-benzo(b)naphtho(2,1-d)furans, which in turn can be transformed into their arylides by conventional reactions. The arylides form excellent ice-color coupling components which couple with the ordinary diazotized fast bases. In the case of these compounds the coupling takes place at the 10 carbon atom. Instead of first preparing the dihydroxy-benzo(b)naphtho-(2,1-d)furan it is also possible to start with a resorcinol monoether in which the hydrogen of one of the 2-hydroxyl groups is replaced by a lower alkyl group such as methyl, ethyl, propyl, iso-propyl, butyl, amyl, and the like. This results in producing a 5-hydroxy-benzo(b)naphthofuran which couples in the 6 position. For this reason the azo group in the typed formula for the dyes above is shown as going into the center of the ring system signifying that the coupling may be either on the benzene ring or on the naphthalene ring depending on the nature of the $R_1$ and $R_2$ radicals.

The dyes obtained from the coupling components of the present invention and particularly from those having a 8-carboxyarylide are desirable deep shades such as various tints of brown.

Alkylation of the 5,9-dihydroxy-benzo(b)naphthofuran may be carried out by heating the compound with the desired alcohol in the presence of sulfuric acid: any of the lower alkanols may be used such as methanol, ethanol, propanol, iso-propanol, butanol, iso-butanol, or any of the amyl alcohols. This alkylation procedure produces the 5-alkoxy-9-hydroxy-benzo(b)naphtho-(2,1-d)furan and compounds of this type when coupled with diazotized fast bases couple into the benzene ring rather than the naphthalene ring. The ease with which coupling takes place is a very important property of the coupling components of the present invention. There are no hydroxy groups ortho or para to the hydroxy group which directs the coupling and there is no danger of attacking the diazonium salt itself. The ready coupling together with the desirable deep shades obtained make the coupling components of the present invention a valuable source of azoic coloring matters.

The invention will be illustrated in greater detail in conjunction with the following specific examples. The parts are by weight unless otherwise specified.

*Example 1*

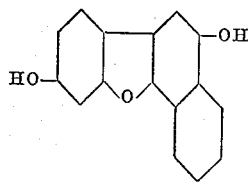

A solution of 60 parts of naphthoquinone in 400 parts of acetic acid is added to a solution of 34.5 parts of resorcinol in 150 parts of acetic acid. To the resulting mixture at 50° C. is added about 3 parts of 50% sulfuric acid. The mixture is slowly heated to reflux and held at reflux until the reaction is substantially complete. The reaction mixture is then allowed to cool and after clarifying, if necessary, it is drowned in water. The solid product is isolated by filtration and washing, and dried at 70° C. For purification, the product is then dissolved in 90 parts of dry pyridine and 200 parts of dry benzene. 94 parts of acetic anhydride is added and the mixture is stirred at reflux until acylation is complete. The mixture is then cooled and the diacetylated product is isolated by filtration and washed with benzene and petroleum ether. The cake is dried at 70° C. and slurried in 600 parts of methanol. The mixture is heated to the boil and 166 parts of 20% sodium hydroxide solution is added. The mixture is stirred and heated until a clear solution is obtained. It is then cooled and added to a solution of 160 parts of concentrated hydrochloric acid in 500 parts of 50% aqueous ethanol. The white curdy product is isolated by filtration, washed with water, and dried. It is shown by analysis and by quantitative acetylation to be a pure dihydroxy compound. It analyzes correctly and has a melting point of 215–217° C.

*Example 2*

The product of Example 1 is padded on pieces of cotton cloth which are then immersed in baths containing various diazotized amines. The dyed cloths are observed to have the following shades:

3,3'-dimethoxybenzidine _____ Brownish black.
2-methoxy-5-nitroaniline _____ Red brown.
2-nitro-4-methoxyaniline _____ Blue brown.
2,5-dichloraniline _____ Red brown.
m-Chloroaniline _____ Khaki.
2-methoxy-4-nitroaniline _____ Blue brown.

*Example 3*

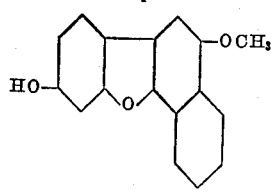

A mixture of 7 parts of the product of Example 1, 7 parts of anhydrous methanol and 2.8 parts of concentrated sulfuric acid is heated at a slight positive pressure at 125° C. until the reaction is substantially complete. A substantial solidification of the reaction mixture occurs and the reaction mixture is therefore diluted with about 150 parts of water. Twenty-two parts of 20% sodium hydroxide solution is then added. The product is salted to precipitate the sodium salt. This is filtered, washed with brine, and then taken up in 200 parts of water containing a smaller amount of sodium hydroxide.

The mixture is heated to effect complete solution and acetic acid is then added gradually to precipitate the free hydroxy compound. The light gray precipitate is filtered, washed, and dried. The crude product is then recrystallized from methanol and water producing a product of good purity.

The procedure of the above example is repeated replacing methanol with an equivalent amount of ethanol. The process proceeds smoothly and the corresponding 5-ethoxy derivative is obtained. In a similar manner the process is repeated respectively with propanol, iso-propanol, butanol and amyl alcohol, in each case the reaction proceeds smoothly and the corresponding 5-ethoxy, 5-propoxy, 5-iso-propoxy, 5-butoxy, and 5-amyloxy derivatives result.

*Example 4*

The products of Example 3 are impregnated on pieces of cloth and then immersed in solutions of the following diozotized amines, the colors produced being as designated.

2-methoxy-4-nitroaniline _____ Tan.
3,3'-dimethoxybenzidine _____ Light brown.
2-aminoanthraquinone _____ Dull tan.
2,5-dichloroaniline _____ Yellow brown.

*Example 5*

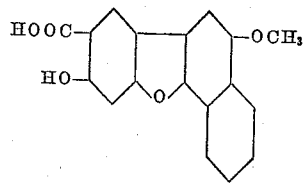

A mixture of 10 parts of the products of Example 3, 60 parts of anhydrous potassium carbonate, and 60 parts of inert substance, such as glass beads or sand, is agitated at 160–165° C. under about 300 p.s.i. pressure of carbon dioxide until carbonation is substantially complete. The product is isolated by leaching out with aqueous alkali followed by acidification of the solution. It is a gray solid of melting point 242–245° C. Further purification is effected by salting out the sodium salt from strongly alkaline solution followed by acidification of the precipitate to form the free acid. The crude product obtained is not 100% the isomer represented by the formula. It appears to be contaminated by small amounts of a product which has such close properties that it is most probably the isomer in which the carboxy group is attached to the 10 carbon atom. The amount of contaminant is insufficient to have any significant effect on the dyestuffs prepared from the coupling component.

*Example 6*

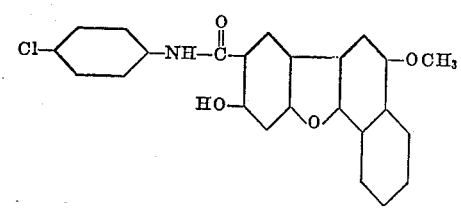

To a mixture of 2.79 parts of the products of Example 5, 1.35 parts of para-chloroaniline, and 34 parts of toluene is added 0.84 part of phosphorous trichloride with stirring at 60° C. It is then heated at reflux with stirring until the reaction is complete, cooled, and the cream-colored solid filtered. After purification by reprecipitation from alkali (after clarification) an almost white solid, M.P. 288–292° C. is obtained. The product is then further purified by recrystallization from monochlorobenzene or xylene producing light yellow crystals having a somewhat higher melting point.

Example 7

The product of Example 6 is padded on pieces of cloth and the latter are then immersed in solutions of diazotized amines, with the following results:

2-methoxy-4-nitroaniline _____ Olive.
2-methoxy-5-nitroaniline _____ Olive green.
2,5-dichloroaniline _____ Olive tan.

We claim:
1. A process of preparing 5,9-dihydroxy-benzo(b)-naphthol(2,1-d)furan which comprises, heating resorcinol with 1,4-naphthoquinone above 80° C. in the presence of sulfuric acid in acetic acid solution.
2. A process of preparing a 5-hydroxy-9-alkoxy-benzo(b)naphtho(2,1-d)furan which comprises heating a m-alkoxyphenol with 1,4-naphthoquinone above 80° C. in the presence of sulfuric acid in acetic acid solution.
3. The process of claim 2 in which the alkoxy group is methoxy.
4. Substituted benzo(b)naphtho(2,1-d)furans represented by the formula

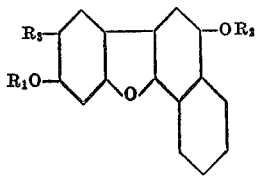

in which $R_1$ is selected from the group consisting of hydrogen and acetyl, $R_2$ is selected from the group consisting of $R_1$ and lower alkyl, $R_3$ being hydrogen when $R_1$ and $R_2$ are identical and when $R_2$ is lower alkyl, $R_3$ being selected from the group consisting of COOH and RNHCO— wherein R is selected from the group consisting of mononuclear aryl and chlorine-substituted mononuclear aryl radicals, $R_3$ being hydrogen only when $R_1$ and $R_2$ are identical.

5. A substituted benzo(b)naphtho(2,1-d)furan represented by the formula

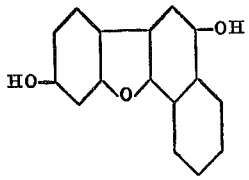

6. A substituted benzo(b)naphtho(2,1-d)furan represented by the formula

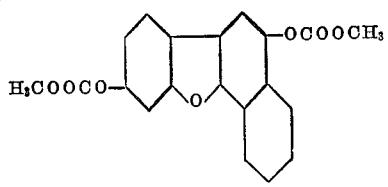

7. A substituted benzo(b)naphtho(2,1-d)furans represented by the formula

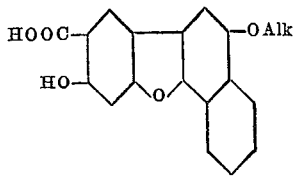

in which Alk is lower alkyl.

8. A substituted benzo(b)naphtho(2,1-d)furan represented by the formula

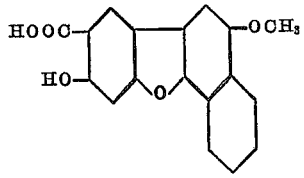

9. A substituted benzo(b)naphtho(2,1-d)furan represented by the formula

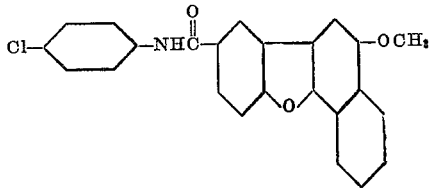

References Cited in the file of this patent

UNITED STATES PATENTS

| | | |
|---|---|---|
| 2,026,908 | Muth | Jan. 7, 1936 |
| 2,146,730 | Gilman | Feb. 14, 1939 |
| 2,557,285 | Heywood et al. | June 19, 1951 |
| 2,566,357 | Orchin | Sept. 4, 1951 |

OTHER REFERENCES

Johnson et al.: J. Chem. Soc., vol. 1950, pages 2381–9 (1950). (Abstracted in C.A. 45: 1108.)

Beilstein: 4th ed., vols. 17–19, 1st supplement 1934, p. 37.

Beilstein: 4th ed., vol. 17, 1933, page 84.